United States Patent
Kim (10) Patent No.: US 9,570,721 B2
(45) Date of Patent: Feb. 14, 2017

(54) BATTERY MODULE

(71) Applicant: SAMSUNG SDI CO., LTD., Yongin-si, Gyeonggi-do (KR)

(72) Inventor: Myung-Chul Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 175 days.

(21) Appl. No.: 14/197,105

(22) Filed: Mar. 4, 2014

(65) Prior Publication Data

US 2014/0356690 A1    Dec. 4, 2014

(30) Foreign Application Priority Data

May 29, 2013    (KR) .................... 10-2013-0061182

(51) Int. Cl.
*H01M 2/02*    (2006.01)
*H01M 2/10*    (2006.01)

(52) U.S. Cl.
CPC ....... *H01M 2/1077* (2013.01); *H01M 2220/20* (2013.01)

(58) Field of Classification Search
CPC ............................ H01M 2/1077; H01M 2/206
See application file for complete search history.

(56) References Cited

U.S. PATENT DOCUMENTS

| | | | |
|---|---|---|---|
| 2003/0211382 A1* | 11/2003 | Aoyama | H01M 2/105 429/96 |
| 2010/0112425 A1* | 5/2010 | Dunn | H01M 2/024 429/99 |
| 2011/0151301 A1* | 6/2011 | Kim | H01M 2/1077 429/120 |
| 2011/0294000 A1 | 12/2011 | Kim et al. | |
| 2012/0164504 A1 | 6/2012 | Takashina et al. | |
| 2013/0022859 A1 | 1/2013 | Lim | |

FOREIGN PATENT DOCUMENTS

| | | |
|---|---|---|
| DE | 10 2011 003535 A1 | 8/2012 |
| GB | 187 287 A | 10/1922 |

(Continued)

OTHER PUBLICATIONS

European Search Report from corresponding European Application No. 14170305.8, European Search Report dated Oct. 29, 2014 and mailed Nov. 5, 2014 (6 pgs.).

(Continued)

*Primary Examiner* — Stewart Fraser
*Assistant Examiner* — Olatunji Godo
(74) *Attorney, Agent, or Firm* — Lewis Roca Rothgerber Christie LLP (57) ABSTRACT

A battery module including: a plurality of battery cells arranged in a direction and each including a terminal portion on a first surface thereof; a pair of end plates each configured to face a wide surface of a battery cell at a respective outer end of the plurality of battery cells; side plates configured to support side surfaces of the battery cells at respective sides of the plurality of battery cells; and a cover configured to cover the first surfaces of the battery cells or second surfaces of the battery cells opposite the first surfaces, and a side plate of the side plates includes a bent portion that is bent to overlap with an end portion of the cover, and the cover is configured to press the bent portion.

17 Claims, 8 Drawing Sheets

(56) References Cited

FOREIGN PATENT DOCUMENTS

| | | |
|---|---|---|
| JP | 2007-299544 A | 11/2007 |
| JP | 2008-277085 A | 11/2008 |
| JP | 2009-009853 A | 1/2009 |
| JP | 2012-164545 A | 8/2012 |
| KR | 10-2013-0011740 | 1/2013 |

OTHER PUBLICATIONS

European Examination Report mailed Jun. 30, 2016 in corresponding European Application No. 14170305.8-1373 (5 pgs.).
KIPO Office Action dated Dec. 1, 2016, for corresponding Korean Patent Application No. 10-2013-0061182 (5 pages).

* cited by examiner

BATTERY MODULE

CROSS REFERENCE TO RELATED APPLICATION

This application claims priority to and the benefit of Korean Patent Application No. 10-2013-0061182, filed on May 29, 2013 in the Korean Intellectual Property Office, the entire content of which is incorporated herein by reference.

BACKGROUND

1. Field

Aspects of embodiments of the present invention relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series to be used, for example, in driving motors of devices requiring high power, e.g., electric vehicles, hybrid vehicles, and the like. Further, a battery pack can be configured by electrically connecting a plurality of such battery modules to one another.

As the external appearance of devices employing a battery module is diversified, it is required to diversify the shape of the battery module, corresponding to the diversified external appearances of the devices. Particularly, demands on lightweight and compact battery modules are increased. However, the safety of the battery module should be secured. Therefore, studies on the structure of a battery module capable of satisfying all the requirements have been conducted in various fields.

SUMMARY

According to an aspect of embodiments of the present invention, a battery module includes a novel member, and has improved safety and process efficiency due to the novel member.

According to another aspect of embodiments of the present invention, in a battery module, battery cells are firmly fixed without being moved by an external force.

According to one or more embodiments of the present invention, a battery module includes: a plurality of battery cells arranged in a direction and each including a terminal portion on a first surface thereof; a pair of end plates each configured to face a wide surface of a battery cell at a respective outer end of the plurality of battery cells; side plates configured to support side surfaces of the battery cells at respective sides of the plurality of battery cells; and a cover configured to cover the first surfaces of the battery cells or second surfaces of the battery cells opposite the first surfaces, and a side plate of the side plates includes a bent portion that is bent to overlap with an end portion of the cover, and the cover is configured to press the bent portion.

At least one of an upper portion or a lower portion of the side plate may include the bent portion overlapped with the end portion of the cover, and an extending portion protruded toward the cover at the bent portion, and the cover may have an accommodating portion into which the extending portion is inserted.

The side plate may include a base portion opposite to the side surfaces of the battery cells, the bent portion bent at an end portion of upper and lower portions of the base portion to surround at least a portion of the battery cells, and an extending portion extended at the bent portion toward a direction away from the battery cells.

The bent portion may be bent at the base portion to be perpendicular to the base portion, and the extending portion may be extended at an end of the bent portion to be perpendicular to the bent portion.

The bent portion may be bent at the end portion of the base portion to be perpendicular to the base portion, and the extending portion may be extended from a surface of the bent portion to be perpendicular to the surface of the bent portion.

The side plate may further include a flange portion at an end portion of the base portion and configured to surround at least a portion of an end plate of the pair of end plates.

The flange portion may be bent at the base portion to be perpendicular to the base portion.

The cover may be mounted on the battery cells, and may include a first partition wall configured to press the bent portion of the side plate, and a second partition wall inwardly spaced apart from the first partition wall.

The extending portion may be inserted between the first and second partition walls.

A length of the first partition wall may be less than that of the second partition wall on respective surfaces of the first and second partition walls that are opposite to each other.

A length of the first partition wall may be equal to that of the second partition wall on respective surfaces of the first and second partition walls that are opposite to each other.

The battery module may further include a barrier between neighboring battery cells of the plurality of battery cells and spacing the neighboring battery cells apart from each other, and the side plates may include one or more openings positioned corresponding to the barrier.

The side plates may include a first fastening portion, and the cover may include a second fastening portion at a position corresponding to the first fastening portion and being fastened to the first fastening portion.

The first fastening portion may be extended in parallel to the base portion at the end portion of the base portion, and covers an outer surface of the cover.

The first fastening portion may be adjacent to the end plate, and the bent portion may be spaced apart from the first fastening portion.

The extending portion may be extended at the bent portion to be parallel to the first fastening portion.

The cover may cover the first surfaces of the battery cells, and may have at least one first hole portion through which the terminal portion passes.

As described above, according to an aspect of embodiments of the present invention, a battery module has improved process efficiency due to a novel member.

Further, according to another aspect of embodiments of the present invention, a battery module includes battery cells that are firmly fixed without being moved by an external force.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein. Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. It will be understood that when an element is referred to as being "between" two elements, it can be the only element between the two elements, or one or more intervening elements may also be present. In addition, when an element is referred to as being "on" another element if can fee directly on the another element or indirectly on the another element with one or more intervening elements interposed therebetween. Similarly, when an element is referred to as being "connected to" another element, it can be directly connected to the another element or indirectly connected to the another element with one or more intervening elements interposed therebetween.

Figure 1:
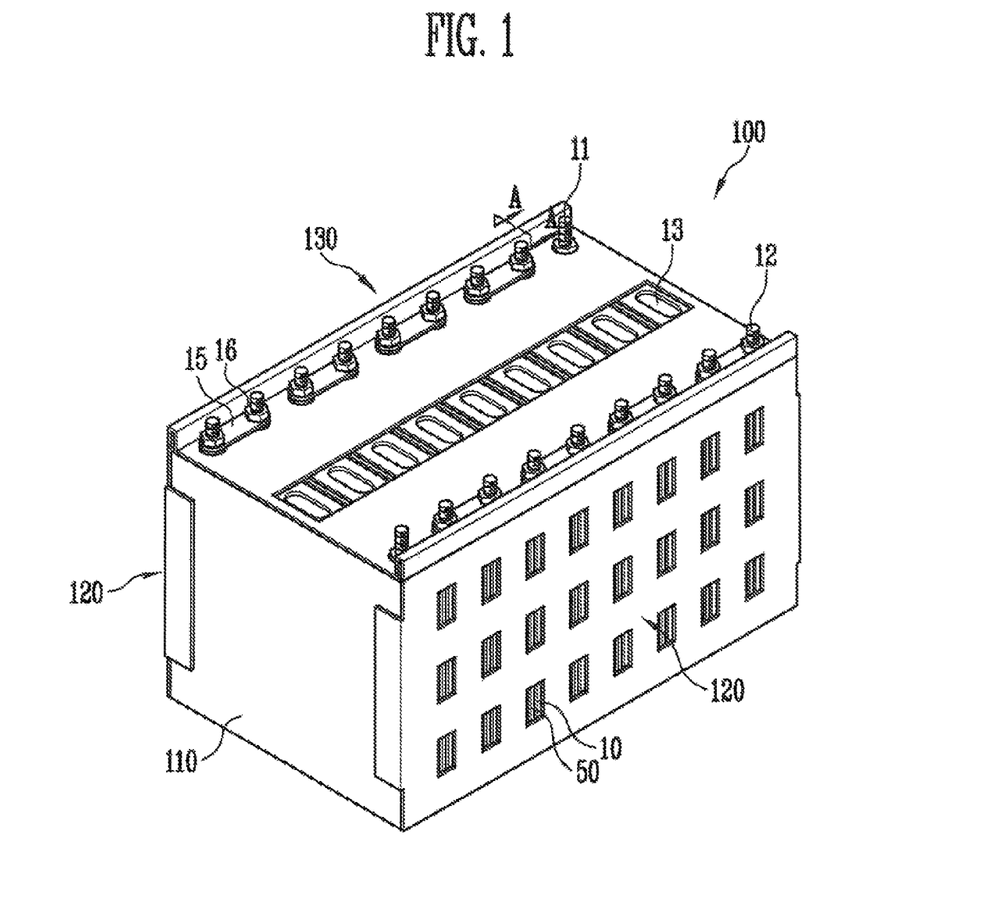
FIG. 1 is a perspective view of a battery module according to an embodiment of the present invention.
Figure 2:
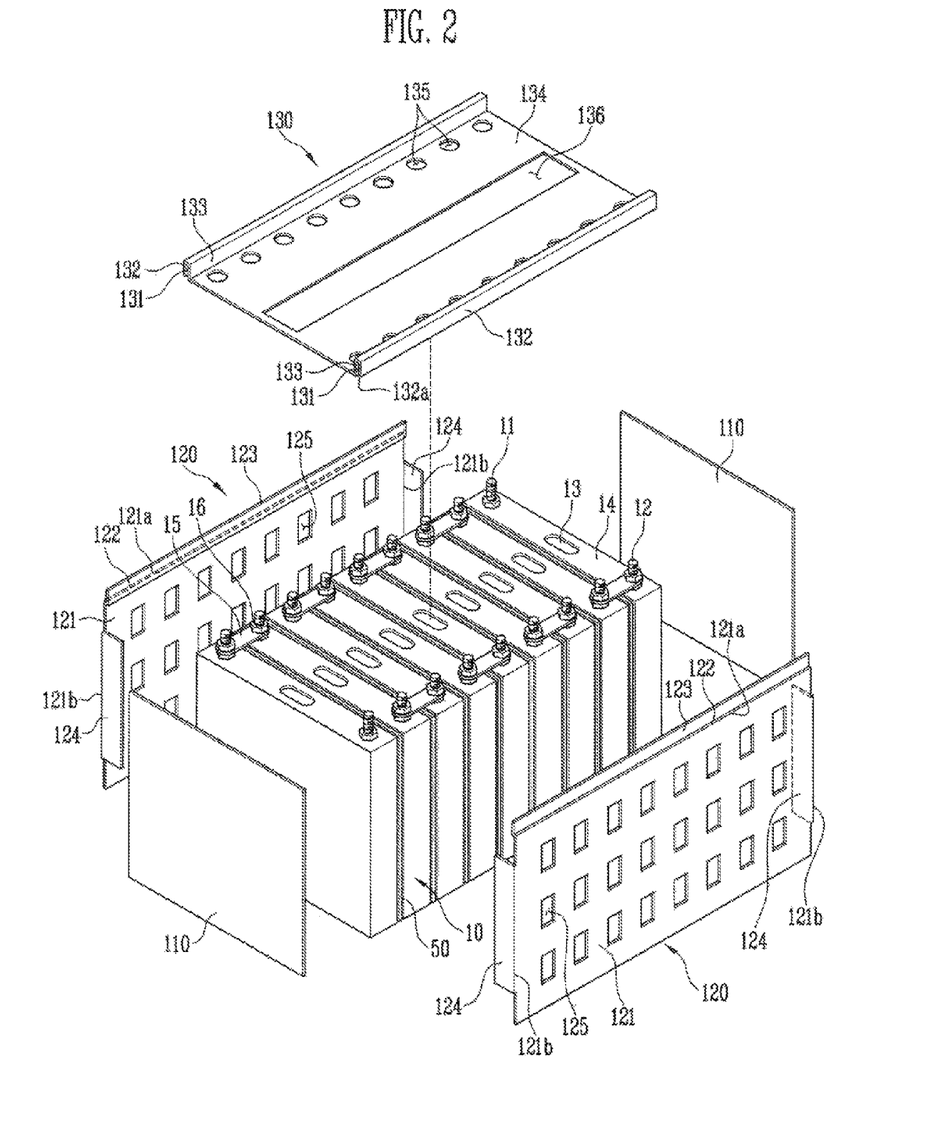
FIG. 2 is an exploded perspective view of the battery module of FIG. 1.

FIG. 1 is a perspective view of a battery module according to an embodiment of the present invention. FIG. 2 is an exploded perspective view of the battery module of FIG. 1.

Referring to FIGS. 1 and 2, a battery module 100 according to an embodiment of the present invention includes a plurality of battery cells 10 each having terminal portions 11 and 12 on a first surface 14 thereof, the plurality of battery cells 10 being aligned or arranged in a direction; a pair of end plates 110 configured to face wide surfaces of the battery cells 10 at the outside of the plurality of battery cells 10; side plates 120 configured to support side surfaces of the battery cells 10 at opposite sides of the plurality of battery cells 10; and a cover 130 configured to cover any one of the first surfaces 14 and second surfaces opposite to the first surfaces 14 of the battery cells 10. Any one of upper and lower portions of the side plate 120 is bent to overlap with an end portion 132a of the cover 130. The cover 130, in one embodiment, may be provided to press the bent portion of the side plate 120.

A bending portion 122 and an extending portion 123 are provided at any one of the upper and lower portions of the side plate 120. The bending portion 122 is overlapped with the end portion 132a of the cover 130, and the extending portion 123 is protruded at the bending portion 122 to face the cover 130. The cover 130, in one embodiment, has an accommodating portion 131 into which the extending portion 123 is inserted.

The battery cell 10, in one embodiment, includes a battery case having the first surface 14, and an electrode assembly and an electrolyte, which are accommodated in the battery case. The electrode assembly and the electrolyte generate energy through an electrochemical reaction therebetween. In one embodiment, the first surface 14 of the battery cell 10 may include a cap assembly. The terminal portions 11 and 12 may be provided on the first surface 14. The terminal portions 11 and 12 may include-positive and negative electrode terminals 11 and 12 having different polarities. In one embodiment, a vent portion 13 may be provided in the first surface 14 and may act as a passage through which gas generated inside the battery cell 10 is exhausted to the outside of the battery cell 10. Neighboring battery cells 10, in one embodiment, are electrically connected to each other through a bus bar 15, and the bus bar 15 may be fixed by a nut 16 or the like.

The battery module 100 may further include a barrier 50 interposed between neighboring battery cells 10 such that the battery cells 10 are spaced apart from each other. One or more openings 125 may be provided in the side plate 120 at a position corresponding to the barrier 50. A cooling medium may be flowed in the battery module 100 through the openings 125 of the side plate 120. In one embodiment, the cooling medium is flowed in a space formed by the barrier 50, so as to perform a heat exchange with the battery cell 10. Thus, it is possible to effectively control heat of the battery cell 10, which is generated by charging/discharging the battery cell 10 plural times, thereby increasing the lifespan of the battery cell 10.

The battery module 100, in one embodiment includes the pair of end plates 110 opposite to each other, the side plates 120 connecting the pair of end plates 110 to each other, and the cover 130 covering one or more of the first surface 14 and the second surface opposite the first surface 14 of the battery cells 10. The battery cells 10 are aligned in a direction such that wide surfaces of the battery cells 10 are opposite to each other, and the end plates 110 may be provided to face wide surfaces of outermost battery cells 10 of the plurality of battery cells 10. In one embodiment, the side plates 120 are connected to the pair of end plates 110 so as to support side surfaces of the battery cells 10.

Although it is illustrated in the battery module 100 according to one embodiment that the cover 130 is provided on only the first surfaces 14 of the battery cells 10, the present invention is not limited thereto. In another embodiment, the cover 130 may be provided to cover one or more of the first surface 14 of the battery cell 10 and the second surface opposite to the first surface 14, i.e. the bottom surface of the battery cell 10.

Figure 3:
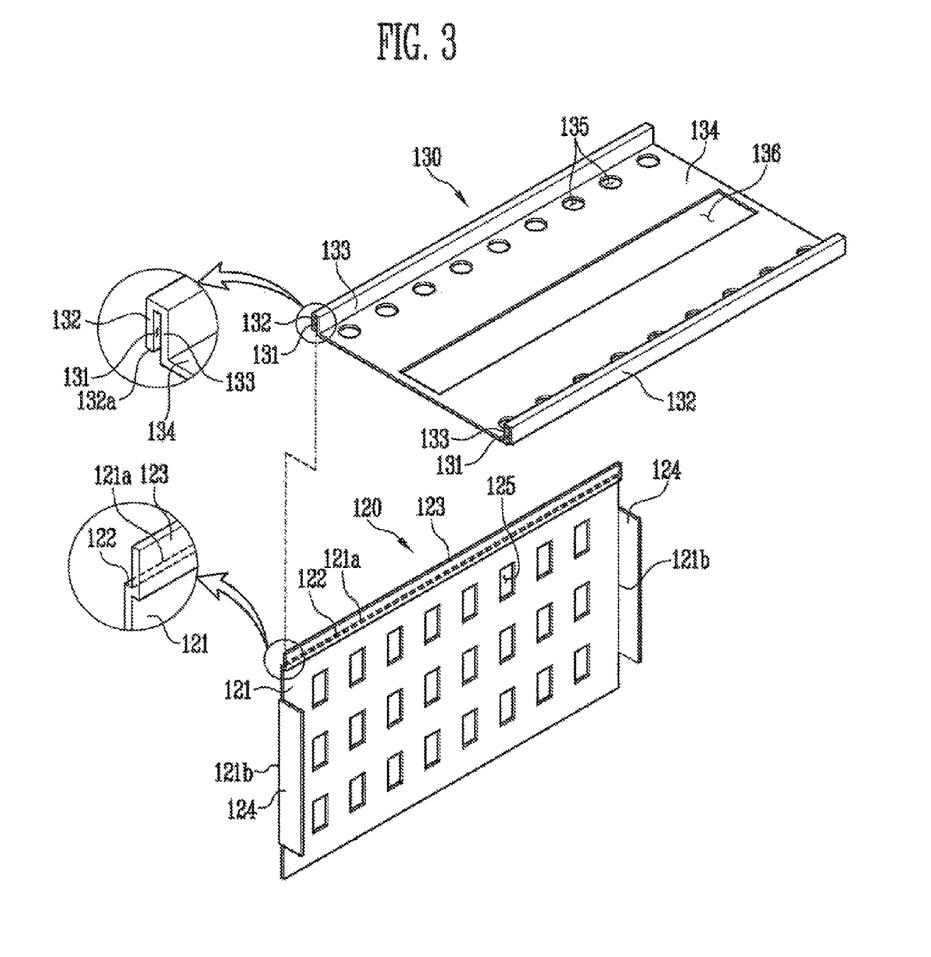
FIG. 3 is a perspective view of a side plate and a cover of the battery module of FIG. 1, according to an embodiment of the present invention.
Figure 4:
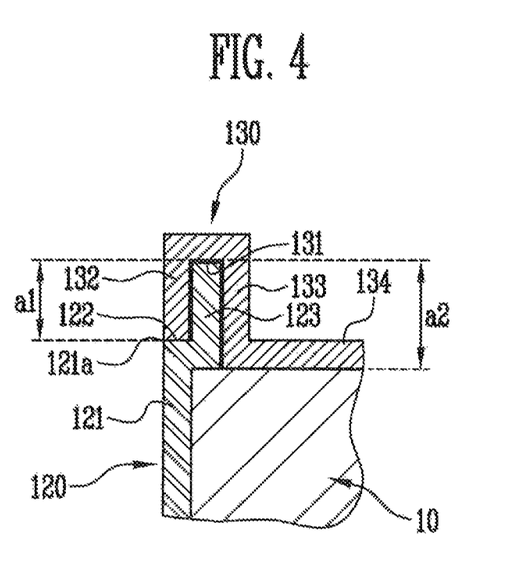
FIG. 4 is a partial sectional view of the battery module of FIG. 1, taken along the line A-A.

FIG. 3 is a perspective view of a side plate and a cover of the battery module 100, according to an embodiment of the present invention. FIG. 4 is a partial sectional view of the battery module 100, taken along the line A-A of FIG. 1.

Referring to FIGS. 3 and 4, in one embodiment, the side plate 120 may include a base portion 121 opposite to a side surface of the battery cell 10, a bending portion 122 bent at an end portion 121a of at least one of upper and lower portions of the base portion 121 to surround at least one portion of the battery cell 10, and an extending portion 123 extended at the bending portion 122 to face a direction opposite to that of the battery cell 10. The bending portion 122 may be bent perpendicular to the base portion 121 at the end portion 121a of the base portion 121, and the extending portion 123 may be extended perpendicular to the bending portion 122 at an end of the bending portion 122. That is, the bending portion 122 may be parallel or approximately parallel to the first surface 14 of the battery cell 10, such that one end of the bending portion 122 is connected to the base portion 121 and the other end of the bending portion 122 is connected to the extending portion 123.

The side plate 120, in one embodiment, may further include a flange portion 124 at one or both of left and right end portions 121b of the base portion 121 to surround at least one portion of one or both of the end plates 110. The flange portion 124 may be bent perpendicular to the bass portion 121. Thus, the end plate 110 may be firmly fixed by the side plate 120 without any separate fastening member.

The cover 130, in one embodiment, has a mounting surface 134 mounted on the battery cells 10, and one or more first hole portions 135 and one or more second hole portions 136 may be provided in the mounting surface 134. The terminal portions 11 and 12 of the battery cell 10 may pass through the first hole portions 135, and the second hole portion 136 allows the vent portions 13 of the battery cells 10 to be exposed therethrough. The end portion 132a of the cover 130 may come in contact with the bending portion 122 of the side plate 120. First and second partition waits 132 and 133 protruded toward the battery cell 10 may be respectively provided at both sides of the cover 130. The first partition wall 132 may be provided adjacent to the end portion 121a of the base portion 121 of the side plate 120, and the second partition wall 133 may be provided to be inwardly spaced apart from the first partition wall 132. The second partition wall 133 is connected to the mounting surface 134 of the cover 130.

The extending portion 123 of the side plate 120 may be inserted between the first and second partition walls 132 and 133. In one embodiment, the extending portion 123 may be forcibly inserted into the accommodating portion 131 provided between the first and second partition walls 132 and 133. A length a1 of the first partition wall 132 may be shorter than a length a2 of the second partition wall 133 on respective surfaces where the first and second partition walls 132 and 133 are opposite to each other.

In the battery module 100 according to one embodiment, the bending portion 122 and the extending portion 123 of the side plate 120 are fastened to the cover 130, and the flange portion 124 of the side plate 120 is fixed to the end plate 110. Thus, the side plate 120, the end plate 110, and the cover 130 are connected to one another, and accordingly, the plurality of battery cells 10 may be firmly fixed without any separate fastening member.

Various other embodiments off the present invention are described below with reference to FIGS. 5 to 8. Components and aspects of these embodiments, except for the differences described below, may be the same or similar to those of the battery module 100 described above with reference to FIGS. 1 to 4, and, therefore, further detailed description of the same or similar components and aspects will be omitted.

Figure 5:
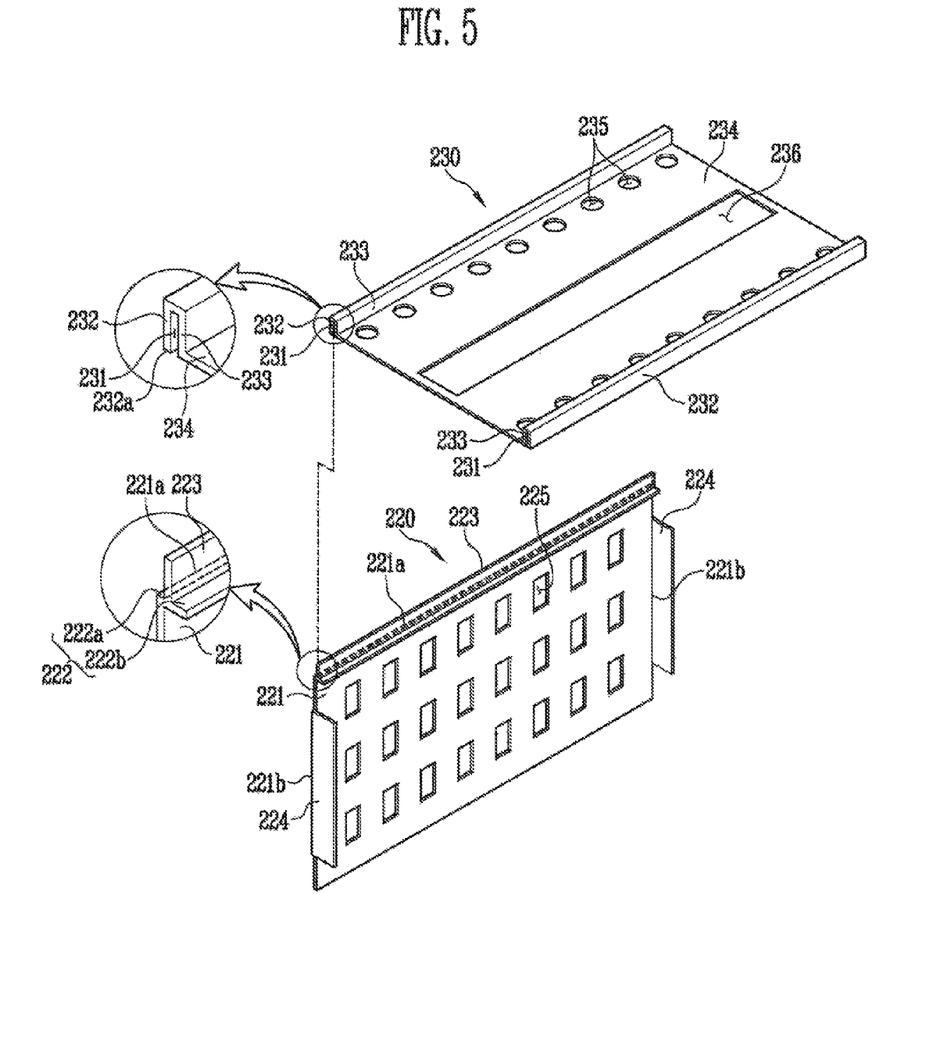
FIG. 5 is a perspective view of a side plate and a cover of a battery module according to another embodiment of the present invention.
Figure 6:
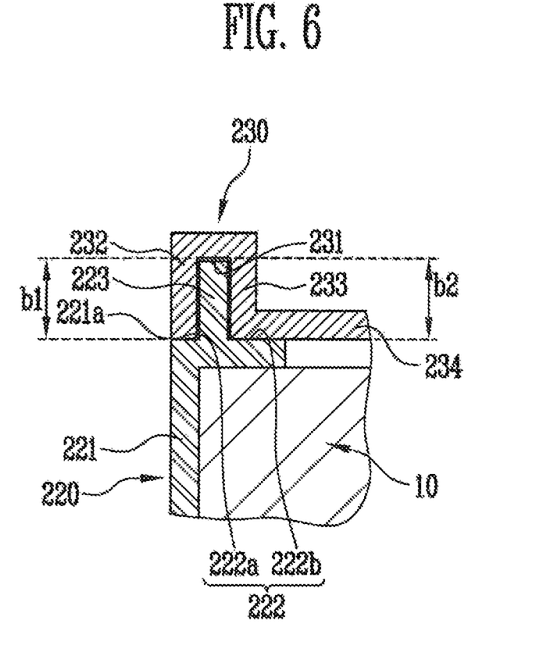
FIG. 6 is a sectional view showing a state in which the side plate and the cover of FIG. 5 are coupled to each other.

FIG. 5 is a perspective view of a side plate and a cover of a battery module according to another embodiment of the present invention. FIG. 6 is a sectional view showing a state in which the side plate and the cover of FIG. 5 are coupled to each other.

Referring to FIGS. 5 and 6, in one embodiment, an extending portion 223 of a side plate 220 is inserted into an accommodating portion 231 of a cover 230. In one embodiment, the cover 230 may press at least one portion of a bending portion 222 of the side plate 220.

A base portion 221 of the side plate 220 is provided to support side surfaces the battery cells 10 of the battery module. The bending portion 222 is connected to at least one end portion 221a of upper and lower end portions of the base portion 221, and a flange portion 224 is provided at one or both of left and right end portions 221b of the base portion 221. One or more openings 225 may be provided in the base portion 221. The cover 230 may have a mounting surface 234 mounted above first surfaces of the battery cells 10 or below second surfaces of the battery cells 10 opposite the first surfaces. In one embodiment, one or more first hole portions 235 corresponding to terminal portions of the battery cells 10 and one or more second hole portions 236 corresponding to vent portions of the battery cells 10 may be provided in the mounting surface 234.

The bending portion 222 of the side plate 220 may be bent at the base portion 221 to be perpendicular to the base portion 221, and the extending portion 223 of the side plate 220 may be extended on a surface of the bending portion 222 to be perpendicular to the surface of the bending portion 222. In one embodiment, the extending portion 223 is extended approximately from the middle of the surface of the bending portion 222, and the bending portion 222 includes one side 222a connected to the base portion 221 and another side 222b including an end of the bending portion 222, with the extending portion 223 extending from a location therebetween.

The cover 230, in one embodiment, may include a first partition wall 232 having an end 232a contacted with the one side 222a of the bending portion 222 and a second partition wall 233 contacted with the another side 222b of the bending portion 222. In one embodiment, the first partition wall 232 may be parallel or approximately parallel to the base portion 221 of the side plate 220, and the second partition wall 233 may be connected to the mounting surface 234 of the cover 230. The accommodating portion 231 may be provided between the first and second partition walls 232 and 233, and the extending portion 223 may be fastened to the accommodating portion 231 by being; inserted into the accommodating portion 231. In one embodiment, a length b1 of the first partition wall 232 corresponds to (e.g., is equal to) a length b2 of the second partition wall 233 on surfaces where the first and second partition walls 232 and 233 are opposite to each other.

Figure 7:
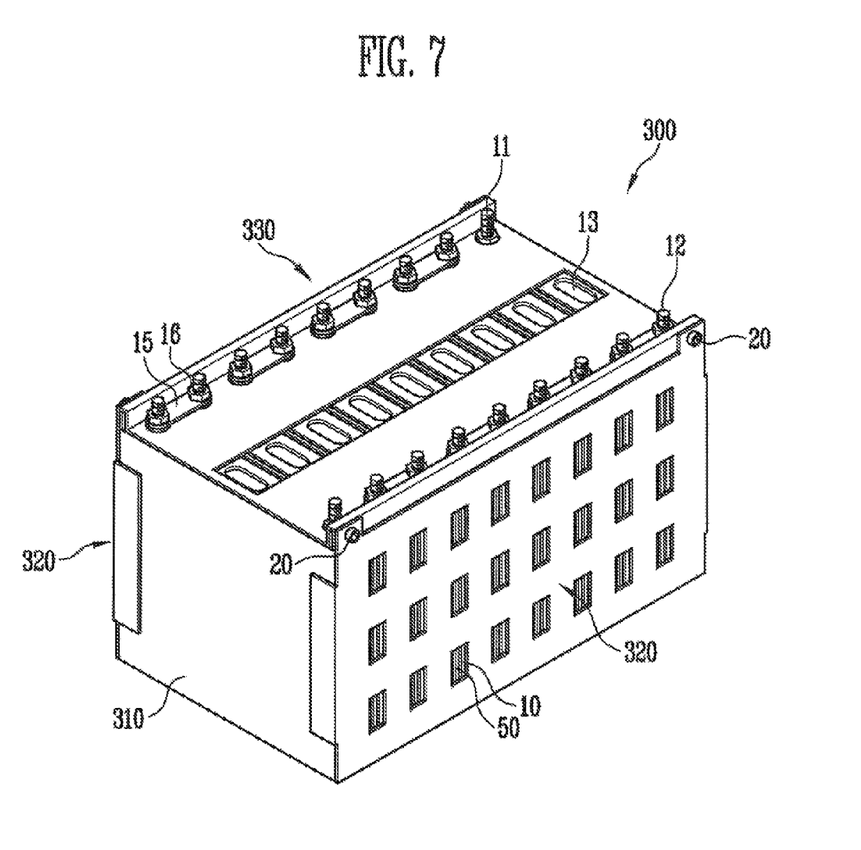
FIG. 7 is a perspective view of a battery module according to another embodiment of the present invention.
Figure 8:
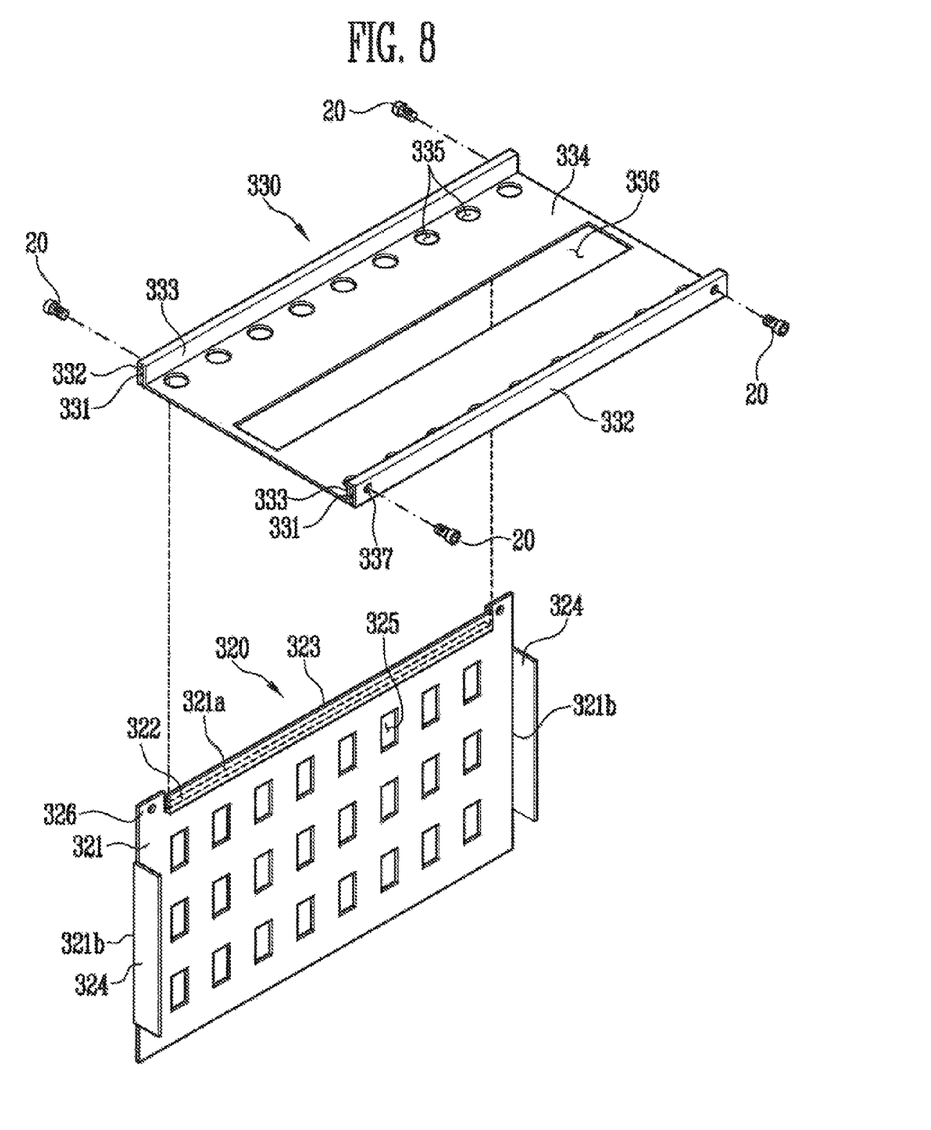
FIG. 8 is a perspective view of a side plate and a cover of the battery module of FIG. 7.

FIG. 7 is a perspective view of a battery module according to another embodiment of the present invention. FIG. 8 is a perspective view of a side plate and a cover of the battery module of FIG. 7.

Referring to FIGS. 7 and 8, in a battery module 300 according to another embodiment of the present invention, a first fastening portion 326 may be provided in a side plate 320, and a second fastening portion 337 at a location corresponding to the first fastening portion 326 may be provided in a cover 330 to fasten the cover 330 to the side plate 320. The first and second fastening portions 326 and 337 may be fastened by a separate fastening member 20. In one embodiment, for example, the fastening member 20 may include a bolt or stud.

In one embodiment, the side plate 320 may include a base portion 321, a bending portion 322 bent at an end portion 321a of at least one of upper and lower portions of the base portion 321, and an extending portion 323 bent toward the cover 330 at the bending portion 322. A flange portion 324 may be provided at one or both of left and right end portions 321b of the base portion 321, and one or more openings 325 may be provided in the base portion 321 so as to correspond to the barrier 50 provided between the battery cells 10. The cover 330 is mounted on the first surface of the battery cell 10. In one embodiment, the cover 330 may include a mounting surface 334 having one or more first hole portions 335 and one or more second hole portions 336. The terminal portions 11 and 12 may be protruded through the first hole portions 335, and the second hole portion 336 allows the vent portion 13 to be exposed therethrough.

The first fastening portion 326, in one embodiment, may be extended in parallel to the base portion 321 at any one of upper and lower portions of the base portion 321 of the side plate 320, so as to cover an outer surface of the cover 330. The first fastening portion 326 may be provided near or adjacent to an end plate 310, and the bending portion 322 is connected to the base portion 321. In one embodiment, the bending portion 322 has a width narrower than that of the base portion 321, and is spaced apart from the first fastening portion 326. The extending portion 323 may be extended at the bending portion 322 to be parallel to the first fastening portion 326.

An accommodating portion 331 into which the extending portion 323 of the side plate 320 is inserted may be provided in a space between a second partition wall 333 connected to the mounting surface 334 of the cover 330 and a first partition wall 332 outwardly spaced apart from the second partition wall 333. The extending portion 323 is inserted into the accommodating portion 331, and the first fastening portion 326 of the side plate 320 may be overlapped with an outer surface of the first partition wall 332 of the cover 330 and then fastened to the second fastening portion 337 by the separate fastening member 20. Accordingly, fastening between the side plate 320 and the cover 330 may be increased, such that the plurality of battery cells 10 may be firmly fixed.

While the present invention has been described in connection with certain exemplary embodiments, it is to be understood that the invention is not limited to the disclosed embodiments. Although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims and equivalents thereof.

What is claimed is:

1. A battery module comprising:
   a plurality of battery cells arranged in a direction and each comprising a terminal portion on a first surface thereof;
   a pair of end plates each configured to face a wide surface of a battery cell at a respective outer end of the plurality of battery cells;
   a pair of side plates configured to support side surfaces of the battery cells at respective sides of the plurality of battery cells between the pair of end plates; and
   a cover configured to cover the first surfaces of the battery cells or second surfaces of the battery cells opposite the first surfaces,
   wherein a first side plate of the pair of side plates comprises a base portion opposite to the side surfaces of the battery cells, a bent portion that is bent from the base portion at an angle to overlap with an end portion of the cover, and an extending portion protruded from the bent, portion toward a direction away from the battery cells, and the cover is configured to press the bent portion, and
   wherein the cover has an accommodating portion into which the extending portion is inserted.

2. The battery module of claim 1,
   wherein at least one of an upper portion or a lower portion of the first side plate includes the bent portion overlapped with the end portion of the cover, and the extending portion is protruded toward the cover at the bent portion.

3. The battery module of claim 1, wherein the bent portion is bent at an end portion of upper and lower portions of the base portion to surround at least a portion of the battery cells.

4. The battery module of claim 3, wherein the bent portion is bent at the base portion to be perpendicular to the base portion, and the extending portion is extended at an end of the bent portion to be perpendicular to the bent portion.

5. The battery module of claim 3, wherein the bent portion is bent at the end portion of the base portion to be perpendicular to the base portion, and the extending portion is extended from a surface of the bent portion to be perpendicular to the surface of the bent portion.

6. The battery module of claim 3, wherein the first side plate further comprises a flange portion at an end portion of the base portion and configured to surround at least a portion of an end plate of the pair of end plates.

7. The battery module of claim 6, wherein the flange portion is bent at the base portion to be perpendicular to the base portion.

8. The battery module of claim 3, wherein the cover is mounted on the battery cells, and includes a first partition wall configured to press the bent portion of the first side plate, and a second partition wall inwardly spaced apart from the first partition wall.

9. The battery module of claim 8, wherein the extending portion is inserted between the first and second partition walls, a space between the first and second partition walls defining the accommodating portion.

10. The battery module of claim 8, wherein a length of the first partition wall is less than that of the second partition wall on respective surfaces of the first and second partition walls that are opposite to each other.

11. The battery module of claim wherein a length of the first partition wall is equal to that of the second partition wall on respective surfaces of the first and second partition walls that are opposite to each other.

12. The battery module of claim 3, further comprising a barrier between neighboring battery cells of the plurality of battery cells and spacing the neighboring battery cells apart from each other,
   wherein each of the pair of side plates includes one or more openings positioned corresponding to the barrier.

13. The battery module of claim 3, wherein the first side plate comprises a first fastening portion, and the cover includes a second fastening portion at a position corresponding to the first fastening portion and being fastened to the first fastening portion.

14. The battery module of claim 13, wherein the first fastening portion is extended in parallel to the base portion at the end portion of the base portion, and covers an outer surface of the cover.

15. The battery nodule of claim 14, wherein the first fastening portion is adjacent to the end plate, and the bent portion is spaced apart from the first fastening portion.

16. The battery module claim 15, wherein the extending portion is extended at the bent portion to be parallel to the first fastening portion.

17. The battery module of claim 1, wherein the cover covers the first surfaces of the battery cells and has at least one first hole portion through which the terminal portion passes.

* * * * *

UNITED STATES PATENT AND TRADEMARK OFFICE
CERTIFICATE OF CORRECTION

PATENT NO. : 9,570,721 B2  
APPLICATION NO. : 14/197105  
DATED : February 14, 2017  
INVENTOR(S) : Myung-Chul Kim Page 1 of 1

It is certified that error appears in the above-identified patent and that said Letters Patent is hereby corrected as shown below:

In the Claims

Column 8, Line 1, Claim 1     delete "bent," and insert -- bent --

Column 8, Line 46, Claim 11    delete "claim" and insert -- claim 8, --

Column 8, Line 65, Claim 15    delete "nodule" and insert -- module --

Column 9, Line 1, Claim 16     delete "module" and insert -- module of --

Column 9, Line 5, Claim 17     delete "cells" and insert -- cells, --

Signed and Sealed this  
Eleventh Day of June, 2019

Andrei Iancu  
*Director of the United States Patent and Trademark Office*